W. C. HOOKER.
Hedge-Trimmer.
No. 48,946.
Patented July 25, 1865.
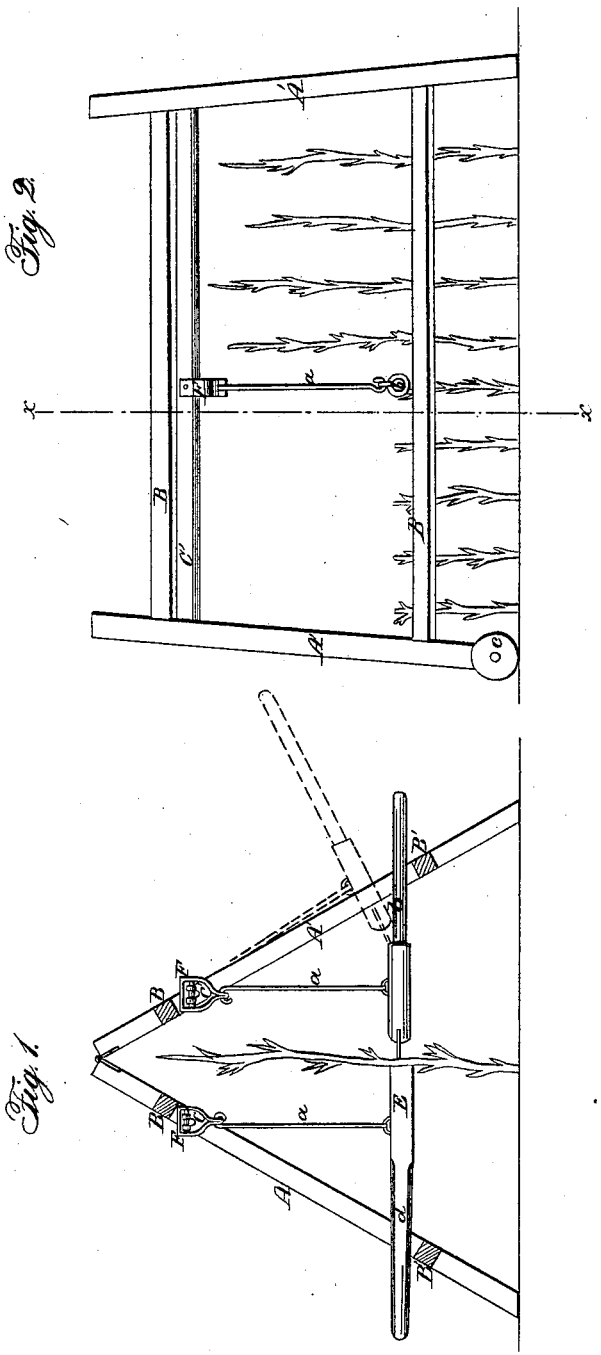
Witnesses:
Inventor:

UNITED STATES PATENT OFFICE.

WILLIAM C. HOOKER, OF ABINGDON, ILLINOIS.

IMPROVEMENT IN MACHINES FOR TRIMMING HEDGES.

Specification forming part of Letters Patent No. 48,946, dated July 25, 1865.

*To all whom it may concern:*

Be it known that I, WILLIAM C. HOOKER, of Abingdon, in the county of Knox and State of Illinois, having invented a new and Improved Machine for Trimming Hedges; and I do hereby declare that the following is a full, clear, and exact description thereof, which will enable others skilled in the art to make and use the same, reference being had to the accompanying drawings, forming part of this specification, in which—

Figure 1 is a vertical section of the machine, taken in the line $x\,x$, Fig. 2. Fig. 2 is a side elevation of the same.

Similar letters of reference indicate like parts.

The object of my invention is to provide a machine whereby hedges or hedge-fences may be trimmed easily and rapidly and accurately, the several stalks being cut at the same height, which is quite essential when a neat and even line of hedge is desired; and my invention consists in constructing a suitable frame, intended to stand over or straddle the hedge, and in arranging on said frame a cutter on the one side and a block against which to cut on the other, both having a swinging motion, and capable of being moved forward and backward the length of the frame as occasion may require during the cutting operation, as hereinafter described.

To enable others to understand my invention, I will proceed to describe it.

A A' represent the legs of the frame, which are hinged together at their tops or joined in any suitable way which will permit an expansion of the lower part of the legs for the purpose of enabling the frame to stand over or straddle the hedge. The pairs of legs A A' are joined together by cross-pieces B B', as shown in Fig. 2, the whole constituting the frame of the machine, which may be folded together when not required for use, and thus economize in room. I do not, however, confine myself to this precise form of frame, as a square or other shaped one might be made to answer the purpose.

C C' are two rods running the entire length of the machine, one on each side thereof, on one of which rods, C', is suspended the cutter D, and on the other, C, the cutter-block E, by chains or ropes or rods $a\,a$, which are attached to sheaves F, fitted to slide or roll on the rods C C'; or they may be attached to any other device which will permit their being easily moved back and forth on the said rods C C', and at the same time enable them to have a swinging motion, which is quite essential.

The cutter D consists of a knife or chisel suitably fitted to the end of a handle, $b$, by which it is operated. The end of the said handle carrying the cutter D may be loaded or made sufficiently heavy to insure a heavier stroke when cutting. It is hung upon the rod $a$ in such manner that it can be detached or taken off whenever it is desired so to do. The cutter-block E is arranged in the same manner, and it consists of a block of wood having a handle, $d$, by which it is pressed against the twig or stalk by a person on one side of the hedge, while another person on the other side throws down the cutter, and thus quickly cuts off the stalk at the desired place without disturbing the roots of the plant in any way. As the operation of trimming progresses and the hedge has been cut for a distance equal to the length of the frame the said frame is moved forward and the cutter and cutter-block moved to its back end and the operation repeated; and to facilitate the moving of the frame I have provided rollers $c$ on its hind legs, as shown in Fig. 2, so that the men, by raising the forward legs, may draw it along to the desired place.

My invention, as above described, is simple in construction, can be cheaply made and easily operated, and will be found to do its work in a perfectly satisfactory manner, and will be found to be of great utility in those parts of the country where hedges are used, not only for ornamental purposes, but for field-fences, whose healthy condition is greatly owing to proper trimming at the proper seasons of the year.

What I claim as my invention, and desire to secure by Letters Patent, is—

A machine for trimming hedges, constructed substantially as herein shown and described.

WILLIAM C. HOOKER.

Witnesses:
 I. HAYMOND ROBINSON,
 S. H. ROBINSON.